June 28, 1949. J. P. VOLLRATH 2,474,208
CONTROL INSTRUMENT
Filed May 25, 1944 2 Sheets-Sheet 1

INVENTOR.
JOSEPH P. VOLLRATH
BY
*B. Spangenberg*
ATTORNEY.

June 28, 1949.  J. P. VOLLRATH  2,474,208
CONTROL INSTRUMENT
Filed May 25, 1944  2 Sheets-Sheet 2

INVENTOR.
JOSEPH P. VOLLRATH
BY Arthur H. Swanson
ATTORNEY.

Patented June 28, 1949

2,474,208

UNITED STATES PATENT OFFICE 2,474,208

CONTROL INSTRUMENT

Joseph P. Vollrath, Glenside, Pa., assignor, by mesne assignments, to Minneapolis-Honeywell Regulator Company, Minneapolis, Minn., a corporation of Delaware Application May 25, 1944, Serial No. 537,343

5 Claims. (Cl. 236—15)

The present invention relates to the control of regenerative furnaces, and more particularly to the control of the time of reversal of open hearth furnaces in response to the differential temperature of the checkers on each end of the furnace as measured by radiation pyrometers.

In most regenerative furnace reversal systems, thermocouples located at some point in the checkers have been used to measure the temperature thereof. When the difference between the temperature measured by the thermocouples reached some predetermined value the furnace was reversed either automatically, or manually in response to a signal. A number of advantages are claimed for this system, but it has been found that it also has a number of disadvantages. For example, it is customary to reverse a furnace when a smaller differential temperature is attained if the furnace is hot than is used when the furnace is cold at the beginning of a heat. When thermocouples are used an operator must manually adjust the control provisions of the control instrument to vary the point at which a reversal is made as the average furnace temperature changes. This is true because the temperature-E. M. F. characteristics of a thermocouple are substantially linear and accordingly the instrument cannot tell from the differential temperature if the individual temperatures are high or low.

Other disadvantages are also encountered with thermocouples. If, for example, they are located in the cold ends of the checkers they do not respond rapidly to changes in the waste gas temperatures and do not indicate a temperature that is truly indicative of furnace conditions. If the thermocouples are located adjacent the ends of the furnace in the hot portion of the checkers they are still measuring gas temperatures instead of furnace temperatures. And in that position the temperatures are so high and the heating conditions so severe that the maintenance and replacement costs are excessive.

These difficulties may be overcome by using radiation pyrometers to measure the temperatures of the checkers at points closely adjacent the exit of the furnace. The differential temperature of the checkers as measured in this fashion may be used to indicate when a reversal should take place or to initiate a reversing operation. Also, the actual furnace temperature is taken at the hottest portion of the checkers. It has been felt by some that radiation pyrometers, due to their fourth power characteristics, are unsuitable for the initiation of regenerator reversal with the temperature difference system. Actually, however, it has been found that this exponential characteristic inherently causes more frequent reversal as the temperature head in the furnace system increases. This is in keeping with established practice in many plants, because toward the end of a heat when the checkers are hottest the furnace is reversed more frequently to keep the preheat temperature as high as practical without injuring the checker brickwork.

It has been found that the exponential characteristic of radiation pyrometers inherently provides a "driving power" to the temperature difference system of reversal control. By this is meant that the use of this type of measuring element inherently causes reversal to take place upon the occurrence of a smaller temperature differential as the temperature rises. It is evident, however, that the time between reversals may be too long when starting up with a cold furnace or during furnace delays unless the system is augmented by an automatic timer to cause reversal at some predetermined maximum time regardless of checker temperatures.

It is, therefore, an object of the present invention to provide a furnace reversal system in which the reversing operation is controlled by the temperature difference in the hot ends of the checkers of the furnace. It is a further object of the invention to provide a furnace reversal system of the temperature difference type in which the temperatures are measured by radiation pyrometers that are focused on the checker work of the regenerators closely adjacent the furnace.

A further object of the invention is to provide means in a furnace reversal system to limit the time between reversing operations to some predetermined maximum regardless of furnace conditions. Another object of the invention is to provide a means to initiate a furnace reversing operation when either of the checkerworks reaches some predetermined maximum temperature regardless of any of the other furnace conditions, or the time since the previous reversal took place.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
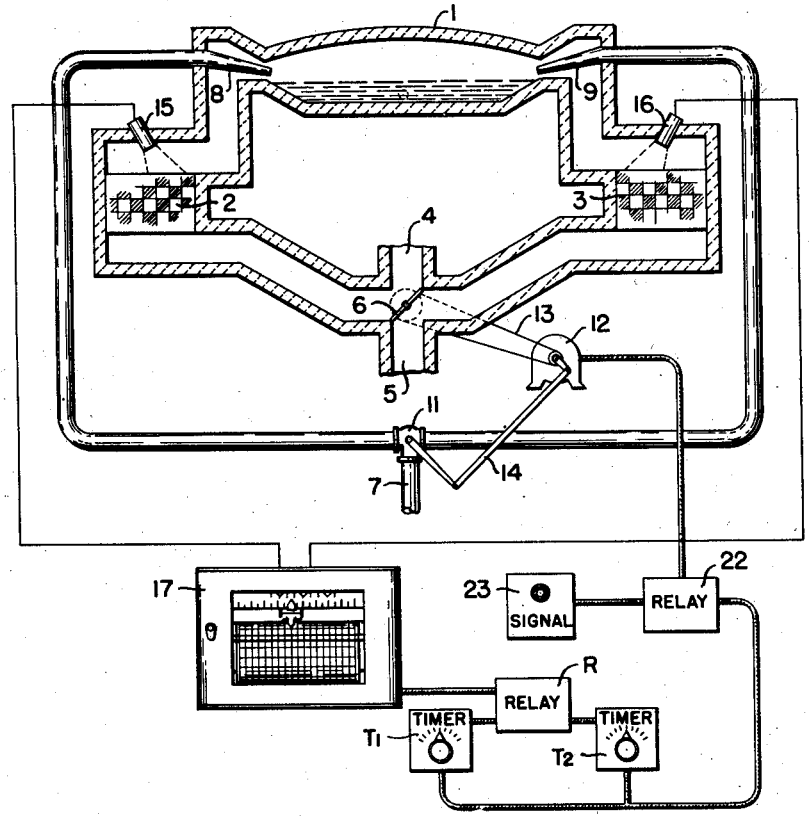
Figure 1 is a schematic diagram of a furnace reversal control system.

Referring first to Figure 1, there is shown at 1 a regenerative furnace of the open hearth type which has checkers 2 and 3 at its ends. In the operation of the furnace, air is forced in through an inlet 4 into one of the checkers which preheats this air to supply air for combustion. The furnace exhaust gases are forced out through the other checker, to pre-heat that checker, and are exhausted through a stack 5. A valve 6, located in the junction of the supply and exhaust pipes, directs air through one end or the other of the furnace and is rotated through 90° to reverse the furnace operation. A suitable fuel is supplied to the furnace through a pipe 7 which has in it branches that lead to burners 8 and 9, one of which is located in each end of the furnace in a position so that the incoming air can be mixed with the fuel in order to insure combustion. The pipe 7 at its junction leading to the burners is provided with a reversing valve 11 that can be operated to supply fuel to one or the other of the burners. The valve 6 and the valve 11 are operated in a conventional manner, to reverse the operation of the furnace, by means of an electric motor 12. As is shown herein, a chain 13 extends between the motor and the valve 6 and a link 14 extends between the motor and the valve 11.

The reversing operations of the furnace are controlled in response to the differential temperatures of the checkers 2. In this case the checker temperatures are measured by radiation pyrometers 15 and 16 respectively that are located so that they are directed toward the top of the checker framework which is closely adjacent the ends of the furnace. At this point the temperature of the checkers is directly related to the temperature of the furnace. These radiation pyrometers are connected to a potentiometer control instrument 17 which serves to record the temperatures as they are measured and to operate the reversing motor 12 when the differential temperatures between the checkers has reached some predetermined point depending upon the furnace temperature. As will be explained more in detail below, the potentiometer 17 is provided with control switches that operate a relay R which in turn energizes timers T¹ and T². These timers control the operation of a second relay 22 that in any conventional manner directly controls the energization of the reversing motor 12. The relay 22 is also used to energize a signal 23 that indicates when a reversing operation is taking place. If desired, the relay 22 can be used to energize only the signal 23 and the reversing operation can be completed manually in response to this signal.

Figure 2:
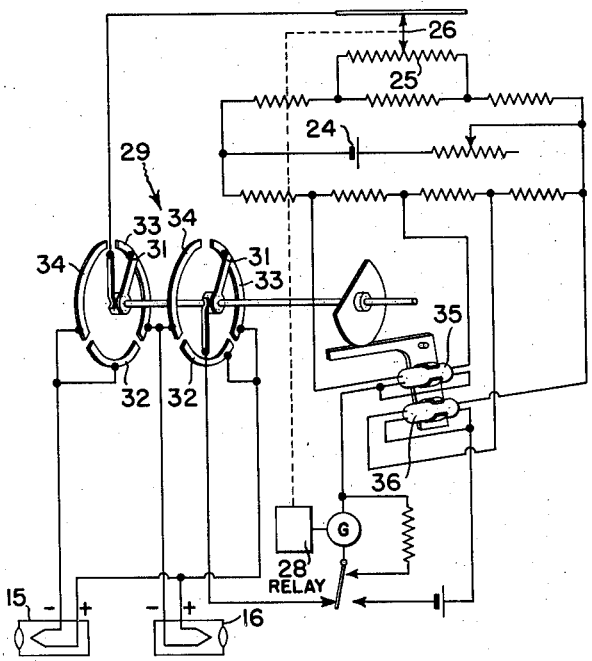
Figure 2 is a potentiometer wiring diagram.

The potentiometer used in this control system is in its mechanical provisions of the type disclosed in Harrison Patent 1,946,280, granted February 6, 1934. This patent discloses an instrument which records the temperatures that are being measured and when these temperatures reach a predetermined value operates a control switch that serves to initiate some control function. In operation, the potentiometer is of the three point type and it makes a record of the temperature of each of the radiation pyrometers and controls in response to the differential temperature of these two pyrometers. The potentiometer circuit, see Figure 2, is conventional in that the potential of a cell 24 is impressed across a slidewire 25. This known potential drop is opposed by an unknown potential generated by one of the pyrometers 15 or 16 that is proportional to the temperature of the corresponding checker. A contact 26 is moved along the slide-wire 25 until a galvanometer 27 which is responsive to the difference in the known and unknown potentials reaches a neutral position. This galvanometer in known fashion controls a relay 28 to shift the contact 26 until the potentiometer circuit is in balance. For alternately connecting the instrument to the pyrometers 15 and 16 there is provided a selector switch 29 which is periodically operated to move bridging contacts 31 so that contacts 32 or 33 or 34 may be connected in the potentiometer circuit. As shown in the drawing, when the bridging contacts 31 engage the contacts 32 the potential developed by radiation pyrometer 15 will be impressed upon the potentiometer circuit and a record of the temperature of that potentiometer will be made. When the bridging contacts 31 engage contacts 33 the radiation pyrometer 16 will be placed in the potentiometer circuit and the instrument will record the value of the temperature of that pyrometer. When the bridging contacts 31 are in engagement with the contacts 34, the two pyrometers 15 and 16 will be connected differentially and the differential of their potentials will be impressed upon the potentiometer circuit. At this same time the instrument will actuate control switches to energize the signal 23 and the motor 12 if the differential potential developed by the two pyrometers has reached some predetermined value.

Since the potential impressed upon the instrument is considerably less when the radiation pyrometers are differentially connected than when they are individually connected to the instrument a range changing device must be provided so that a proper operation will be obtained. To this end switches 35 and 36 are placed in the potentiometer circuit, and they are moved from the position in which they are shown to the right when the selector switch is adjusted so that bridging contacts 31 engage contacts 34 to thereby place other resistances in the circuit and change the range of the instrument when it is connected to measure the differential of the potentials developed by the two radiation pyrometers. In calibrating an instrument of this type a conventional practice is followed with respect to the calibrations of the temperatures to be measured individually by the two radiation pyrometers. But when pyrometers 15 and 16 are both in circuit the instrument is so calibrated that its control member will be in its mid-position when the differential temperature is zero. Thereafter, depending upon which of the pyrometers produces the largest potential and whether the resultant potential is positive or negative as the checkers are heated up and cooled down, the control member of the instrument will be moved to the right or to the left of its mid-position. When the potential of one pyrometer differs a predetermined amount from the potential of the other pyrometer the control mechanism will be operated to initiate the furnace reversing operations.

Since radiation pyrometers have a temperature-E. M. F. curve that varies as the fourth power, such instruments produce small E. M. F. changes per degree temperature change when the temperature measured is low but produce large E. M. F. changes per degree of temperature change when the temperature is high. Due to this characteristic of radiation pyrometers, it will be seen that when the temperature of the furnace is low it will require a large difference between the temperatures of the checkers in order to produce a sufficiently large potential to move the control member a given amount along its scale to initiate its reversing operation. When, however, the temperature of the furnace increases, as it does as the heat progresses, the potential developed by the radiation pyrometers will become larger for smaller temperature changes so that the amount of temperature change needed to cause the same movement of the control member of the instrument from its mid-point will be less. Therefore, because of the characteristics of radiation pyrometers, the furnace will be reversed automatically upon the attainment of a smaller differential temperature when it is hot and toward the latter part of a heat than will be developed when the furnace is cool at the beginning of a heat.

Figure 4:
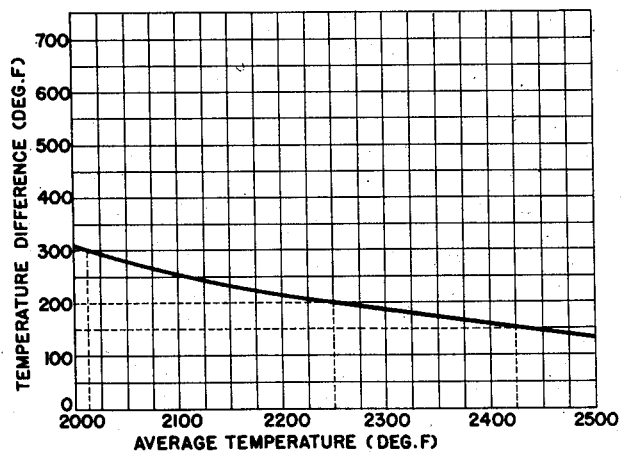
Figure 4 is a curve showing temperature difference v. furnace temperature.

The curve of Figure 4 shows the average temperatures developed during a heat plotted against the differential temperatures that are used for reversing as the heat progresses. For example, when the furnace is about 2010°, reversal takes place when the difference between the temperatures of the checkers 2 and 3 is approximately 300°. When the temperature of the furnace is 2250°, reversal takes place when the difference between the temperature of the checkers is 200°, and when the temperature of the furnace is 2425°, reversal will occur when the difference between the temperature of the checkers 2 and 3 is 150°. The characteristics of the radiation pyrometer as it is heated will closely follow and produce reversals in accordance with the desired curve.

Figure 3:
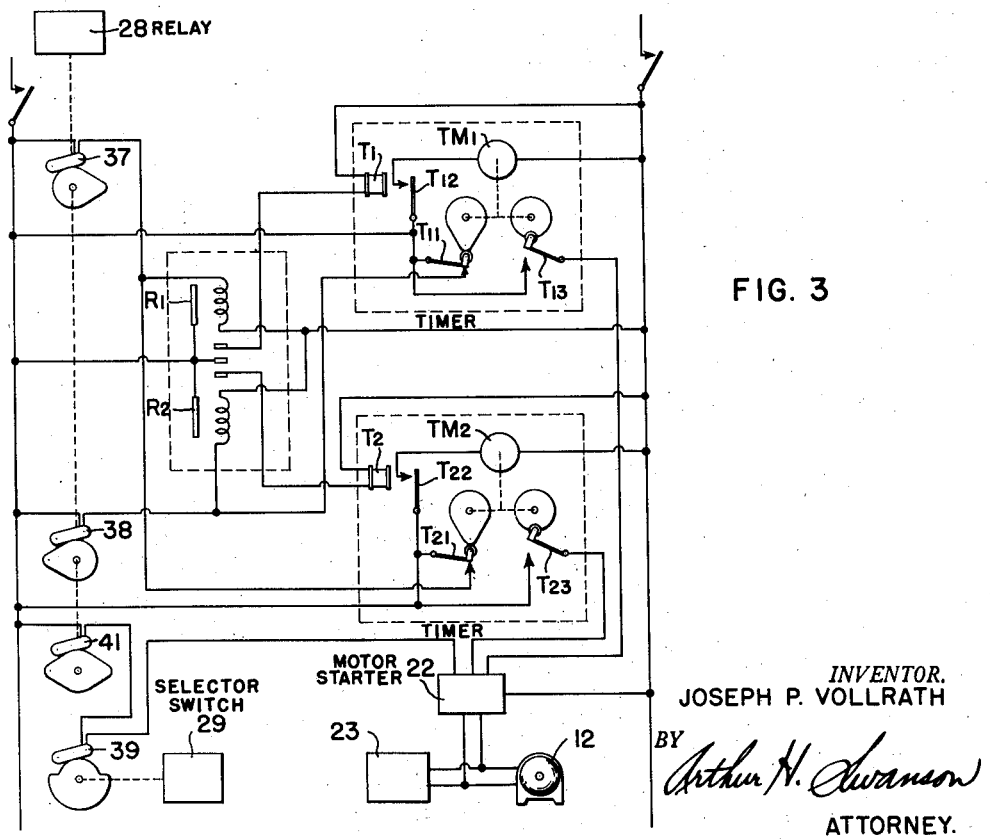
Figure 3 is a control system wiring diagram.

The wiring diagram of Figure 3 shows how the control switches of the instrument 17 may be hooked up with the timers and relays to produce a reversing operation in accordance with differential temperature. The diagram also incorporates, with the timers, the feature of reversal after a predetermined maximum time regardless of the furnace temperatures. Provision is also made to reverse when either of the checkers obtains a given maximum temperature, regardless of the time since the previous reversal or the difference in checker temperatures.

The relay R can be of any conventional commercial type that is provided with two coils and two switches and which is so operated that when one coil is energized one switch is opened and the other closed, and when the other coil is energized the first switch is closed and the second opened. The timers $T^1$ and $T^2$ can be of any commercial type which will reset themselves at the end of the timing period and which have one switch opened and one switch closed during the timing with the positions of these switches reversed at the end of the timing period. Such timers are made by the Automatic Temperature Control Company as their series 2800 timers. As shown herein, for example the timer is provided with a coil $T^1$ that, when energized, serves to close a switch $T^{12}$ to energize the timer motor which operates to close immediately a switch $T^{13}$. When the timing period is up a switch $T^{11}$, that has been open during this period, will be closed and switches $T^{12}$ and $T^{13}$ will be opened to stop the motor.

The potentiometer instrument is provided with switch 37 that is closed when the radiation pyrometer 15 measuring the temperature of checker 2 produces an E. M. F. that is a predetermined amount higher than that produced by the pyrometer 16. The potentiometer is also provided with a switch 38 that is closed when the E. M. F. produced by the radiation pyrometer 16 measuring the temperature of checker 3 is a predetermined amount higher than the E. M. F. produced by the radiation pyrometer 15 measuring the temperature of the checker 2. Means for operating control switches in this manner is shown in the Harrison Patent 1,946,280.

In the operation of the control system assume that air has been forced through checker 3 and the exhaust gases are forced through checker 2. When the temperature of the checker 2 is sufficiently above the temperature of the checker 3 to produce a reversing operation, switch 37 is closed to energize the coil $R^1$ of the relay R. This automatically closes switch $R^{11}$ and opens switch $R^{21}$. When switch $R^{11}$ is closed it energizes the timer coil $T^1$ to close timer switch $T^{12}$ and start the timer motor $TM^1$ operating. When the motor begins to operate switch $T^{13}$ is closed to energize relay 22. The timer and relay switches remain in this position until another reversal produced by closure switch 38 or ending of the timing period, takes place. Energization of relay 22 starts motor 12 operating to reverse the furnace. This operation is performed in any conventional manner and the motor 12 stops when the reversing operation is completed.

After the above reversal takes place, the checker 3 is heated by the exhaust gases while the checker 2 is cooled down as it preheats the incoming gases. This continues until the checker 3 reaches a temperature sufficiently above that of the checker 2 to cause another reversing operation. At this time the switch 38 is closed to energize relay coil $R^2$. This causes switch $R^{21}$ to close and switch $R^{11}$ to open, thereby deenergizing the coil of timer $T^1$ and energizing the coil of timer $T^2$. As soon as that coil is energized, switch $T^{22}$ is closed to start the timer motor $TM^2$ operating this operates immediately to close switch $T^{23}$. As the latter switch closes, the relay 22 will be energized to initiate another reversing operation so that the incoming gases will again be directed through checker 3.

In the normal operation of the furnace, reversing will take place in response to the closure of switch 37 or switch 38. During the early part of each heat, however, the time required for the checkers to reach the proper difference in temperature may be excessive. Therefore, if for example, the switch 37 is not closed within a predetermined time after the last reversal, the timer $T^2$ which was energized to initiate said last reversal will time out and open switches $T^{22}$ and $T^{23}$ and close switch $T^{21}$. Since switch $T^{21}$ parallels switch 37 a reversing operation will be initiated in the manner above described. If the checker 3 is not heated up sufficiently above the temperature of the checker 2 to close switch 38 prior to the time that the timer $T^1$ has finished its operation, switches $T^{12}$ and $T^{13}$ will be opened and switch $T^{11}$ will be closed. Since switch $T^{11}$ parallels switch 38 a reversing operation will take place in the manner above described.

In the latter part of a heat the temperatures of the checkers sometimes become excessive, and in order to prevent damage of the checkers due to excessive heat a means is provided to initiate a reversing operation when either checker reaches a predetermined maximum temperature regardless of the time which has elapsed since the last reversal and regardless of the difference in temperature between the two checkers. Such operation is accomplished by the closing of a switch 41, wheneved the temperature of either of the checkers reaches some predetermined maximum. Mechanism for operating a maximum temperature switch on an instrument of the type shown in Patent 1,946,280, is disclosed in Moore Patent 2,252,301. Since this switch could also be closed to produce an improper reversal at the time that the radiation pyrometers are differentially connected to the instrument, an additional switch 39 is placed in series with switch 41. Means is provided in the instrument so that switch 39 will only be closed when the bridging contacts 31 of selector switch 29 are in engagement with contacts 32 or 33. Therefore, when the instrument is measuring the temperature of either of the checkers, the switch 39 will be closed and a maximum temperature of either checker will cause the closing of switch 41 so that a reversing operation can take place. Mechanism for operating a switch for selective control or range changing purposes of a potentiometer of the type mentioned is disclosed in Ullmann Patent 2,275,233.

From the above it will be seen that I have provided means for reversing a regenerative furnace when the potential developed by radiation pyrometers that are used to measure the checker temperatures have some predetermined differential. I hav also provided means to reverse the furnace at the end of a predetermined time regardless of the temperatures of the checkers and have provided means to reverse the furnace upon the attainment of a predetermined temperature of either checker regardless of the time that has elapsed since the last reversal or of other relative temperatures.

The use of radiation pyrometers to measure the checker temperatures produces a reversing system in which the differential temperatures between the checkers is inherently reduced gradually as the furnace is heated up. This is an important feature.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a regenerative furnace reversal control system for a furnace having two ends, each of which has a regenerative checker brickwork connected therewith through which combustion air is supplied and the products of combustion are withdrawn and a means to direct alternately the combustion air through the checkers, a radiation pyrometer responsive to the temperature of each checker, a control instrument, means to connect differentially said pyrometers to said instrument, a pair of timers, means operated by said instrument upon the attainment of a predetermined positive potential by said pyrometers to energize one timer, means operated by said instrument upon the attainment of a predetermined negative potential to energize the other timer, means operated by each timer to initiate immediately the reversal of said furnace in one direction, and means operated by each timer if the other timer has not in the meantime been energized to initiate the reversal of said furnace in the opposite direction.

2. In a regenerative furnace reversal control system for a furnace having two ends, each of which has a regenerative checker brickwork connected therewith through which combustion air is supplied and the products of combustion are withdrawn and means to direct alternately the combustion air through the checkers, a temperature responsive device responsive to the temperature of each checker, a control instrument, switch means to connect differentially said devices to said instrument, a pair of timers, relay means operated by said instrument upon the attainment of a predetermined positive potential by said devices to energize one timer and upon the attainment of a predetermined negative potential to energize the other of said timers, and means operated by each of said timers to initiate immediately the reversal of said furnace in one direction and after a predetermined time in the opposite direction.

3. In a regenerative furnace reversal control system for a furnace having two ends, each of which has a regenerative checker brickwork connected therewith through which combustion air is supplied and the products of combustion are withdrawn and means to direct alternately the combustion air through the checkers, a temperature responsive device responsive to the temperature of each checker, a control instrument, switch means to connect differentially said devices to said instrument, a pair of timers, relay means operated by said instrument upon the attainment of a predetermined positive potential by said devices to energize one timer and upon the attainment of a predetermined negative potential to energize the other of said timers, means operated by one timer to initiate immediately reversal of said furnace in one direction and after a predetermined time reversal of said furnace in the opposite direction, and means operated by the other of said timers to initiate immediately the reversal of said furnace in said opposite direction and after a predetermined time the reversal of said furnace in said one direction.

4. In a system for controlling the alternate supply of air for combustion to and the exit of exhaust gases from the checker works of a regenerative furnace having two ends each connected with a regenerative checker work, the combination including, a pair of radiation pyrometers each sighted on a portion of one checker work so as to respond to its temperature, a measuring and control potentiometer, a galvanometer in said potentiometer deflecting in response to potentiometer unbalance in accordance with the temperature difference between said pyrometers, electric circuit connections connecting said pyrometers differentially to said galvanometer, a plurality of electric switches operated in response to deflections of said galvanometer, a pair of individual timers each separately connected under the control of one of said switches and each having a first switch closed when the timer is operating to initiate immediately the reversal of the furnace in one direction and a second switch open when the timer is operating and resetting mechanism operable at the end of the timer's cycle to open said first switch and to close said second switch to initiate after a predetermined time the reversal of the furnace in the opposite direction unless the difference in temperature measured by said pyrometers has reached meanwhile a predetermined amount in the opposite sense, said switches being operated by said potentiometer to energize one timer when said pyrometer produces a predetermined positive potential and to energize the other timer when said pyrometer produces a predetermined negative potential.

5. In a system for controlling the reversal of the flow of combustion air and the products of combustion alternately through a furnace having two ends, each of which has a regenerative checker brick work connected thereto, and having means to direct alternately the combustion air through the checkers, the combination including, a pair of temperature devices each responsive to the temperature of one of said checkers, a measuring and control potentiometer having a galvanometer deflecting in response to potentiometer unbalance in accordance with the temperature difference between the temperatures sensed by said temperature measuring devices, a plurality of switches operated by said potentiometer to connect said temperature measuring devices to said element in differential relation, two separate pairs of cyclically-operated electric switches, a relay operated by said potentiometer upon the attainment of a predetermined positive potential by said temperature measuring device to energize one pair of said cyclic switches and upon the attainment of a predetermined negative potential by said temperature measuring devices to energize the other pair of said cyclic switches, and a motor operated by each pair of said cyclic switches to initiate immediately the reversal of said furnace in one direction and after a predetermined time in the opposite direction the reversal of said furnace in the opposite direction, said motor being at all times operable to reverse said furnace in the opposite direction upon said temperature measuring devices attaining a predetermined potential opposite to that predetermined potential which it had attained next previously.

JOSEPH P. VOLLRATH.

REFERENCES CITED

The following references are of record in the file of this patent:

UNITED STATES PATENTS

| Number | Name | Date |
| --- | --- | --- |
| 1,825,372 | Sykes | Sept. 29, 1931 |
| 1,886,430 | Schofield | Nov. 8, 1932 |
| 1,911,831 | Leiss | May 30, 1933 |
| 1,946,280 | Harrison | Feb. 6, 1934 |
| 1,950,614 | Krogh | Mar. 13, 1934 |
| 2,139,861 | Shenk | Dec. 13, 1938 |

FOREIGN PATENTS

| Number | Country | Date |
| --- | --- | --- |
| 563,714 | Germany | Nov. 9, 1932 |